A. Eliaers,
Invalid Chair,
No. 650.
Reissued Jan. 25. 1859.
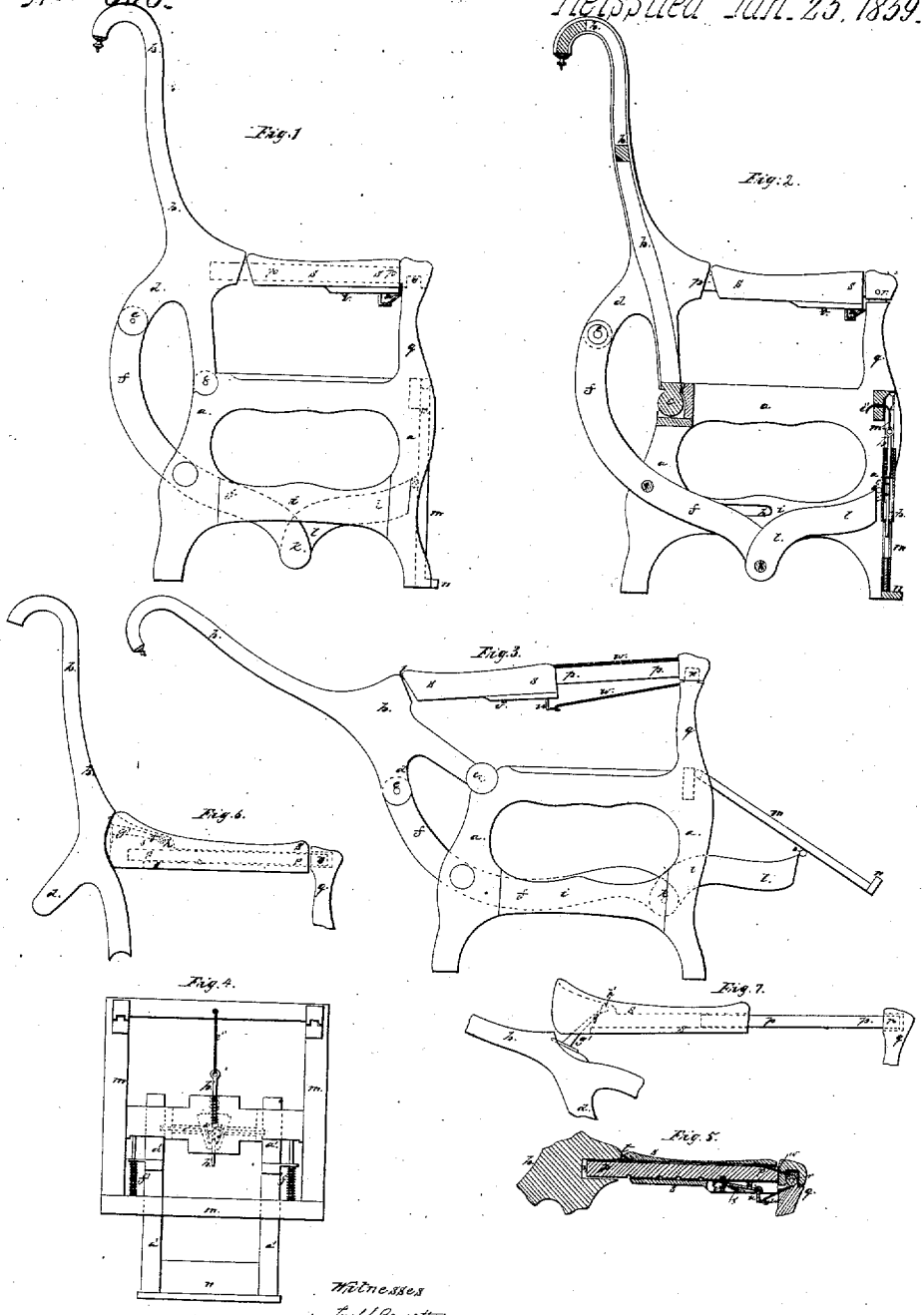
Witnesses
Joseph Gaudet
Albert H. Brown
Inventor:
Augustus Eliaers
N. PETERS, PHOTO-LITHOGRAPHER, WASHINGTON, D. C.

UNITED STATES PATENT OFFICE.

AUGUSTUS ELIAERS, OF BOSTON, MASSACHUSETTS.

IMPROVED RECLINING-CHAIR.

Specification forming part of Letters Patent No. 20,198, dated May 11, 1858; Reissue No. 650, dated January 25, 1859.

*To all whom it may concern:*

Be it known that I, AUGUSTUS ELIAERS, of Boston, in the county of Suffolk and State of Massachusetts, have invented certain new and useful Improvements in Reclining-Chairs; and I do hereby declare that the following description, taken in connection with the accompanying drawings hereinafter referred to, forms a full and exact specification of the same, wherein I have set forth the nature and principles of my said improvements by which my invention may be distinguished from others of a similar class, together with such parts as I claim and desire to have secured to me by Letters Patent.

The figures of the accompanying plates of drawings represent my improvements.

In Plate 1, Figure 1 is a side elevation of my improved chair. Fig. 2 is a central vertical section of the same. In Plate 2, Fig. 3 is a side elevation showing the parts in a different position. Figs. 4, 5, 6, and 7 are detailed views, to be hereinafter referred to.

The present invention relates to that class of chairs that are designed for reclining-chairs and for invalids.

The principal features of my invention are—

First. A novel arrangement of devices for supporting and actuating the back and the foot-rest, whereby they are more rigidly sustained in any position in which they may be placed by the occupant than by other chairs heretofore designed for a similar purpose.

Second. A combination of devices by which the back can be placed in a horizontal or nearly horizontal position, so that the chair can be used for a couch or bed, and at the same time the back be rigidly supported. These results could not be obtained by the usual mode of construction, as will be hereinafter explained.

Third. An adjustable foot-rest, which can be raised or lowered by the occupant at pleasure, and locked at any desired height, so as to adapt the foot-rest to different lengths of limbs.

*a a* in the drawings represent the supporting frame-work or legs of the chair.

*b b* is the back, hinged to the frame-work *a a* at *c*. To projections *d d* of the back are attached by pivots *e e* the curved arms *f f*, extending inside the frame-work *a a*, and having passed through them the shaft *g*, the ends of which enter the grooves *h h* formed in the cross-bars *i i* of the frame-work *a a*. To the ends of the arms *f f* are attached by pivot-joints at *k k* the arms *l l*, that support the frame *m m*, in which the foot-rest *n* is placed, the arms *l l* being hinged to the frame *m m* at *o o*, and the the frame *m m* hinged to the front bar of the frame-work *a a*.

*p p* are guiding-rails attached to the standards *q q* by pivot-joints *r r*. On the rails *p p* slide the arms *s s*, which are hinged to the back *b b* at *t t*, as shown.

*u u*, Fig. 5, are right-angular lever-arms, the studs *v v* of which extend up through the arms *s s* and enter proper holes formed in the rails *p p*, for the purpose of holding the arms *s s*, and consequently the back, &c., in any desired position. By pulling a cord, *w*, the studs *v v* will be disengaged from the holes in the rails *p p* and allow the arms *s s* to slide either forward or backward thereon. Upon relieving the tension upon the cord the studs *v v* will be made to enter again the holes in the rails *p p* by means of a bent spring, *x*.

*y y* are mortises formed in the back *b b*, into which the rails *p p* enter when the back is raised into a slightly-inclined position.

From the foregoing description it will be seen that the back can be depressed into a horizontal position and firmly supported there, being sustained by the arms *f f*, the shaft *g* of which, when the back is in a horizontal position, abutting against the end of the groove *h*, and also by the sliding arms *s s*, fastened to the rails *p p*, as described; and it will be observed that the supporting of the back rigidly in a horizontal position by means of the sliding arms *s s* is effected without shortening the arm of the chair, which otherwise than by the peculiar arrangement above described would be necessary, as, unless the rails *p p* were allowed to enter the back *b b* at *y y*, the back *b b* could not be brought into a vertical position, and the rails *p p*, being hinged at *t t*, as before described, allow both the rails and the sliding arms to play slightly up and down, according as the back is raised or lowered, which, it will be evident, is essential. The foot-rest frame *m m*, being connected by the arms *l l* to the arms *f f*, as before explained, it will of course be raised or lowered by the movements of the back, and will, like the back, be firmly held in any desired position. The foot-rest *n* is attached to a sliding frame, *a′ a′*, Fig. 4, which travels up and down in the frame *m m*, and is locked in any desired position, so as to adapt the foot-rest to the length of limb of the occupant by means of a rod, *b′*, that is attached to a bevel-box, *c′*, the flanges *d′ d′* of which engage with suitable hooks on the ends of bolts *e′ e′*, whereby, when the rod *b′* is raised by a cord, *e″*, the bevel-box *c′* will be raised and withdraw the bolts *e′ e′* from the side bars of the frame *a′ a′*, Fig. 4. On releasing the cord *e″*, the rod *b′* and bevel-box *c′* will be forced downward and cause the bolts *e′ e′* to enter again the side bars of the frame *a′ a′*, thereby locking the foot-rest at any desired point. On withdrawing the bolts *e′ e′* from the side bars of the frame-work *a′ a′* by the rod *b′*, the foot-rest frame will be forced upward by means of spiral springs *f′ f′* until the bolts *e′ e′* are allowed to lock into the frame *a′ a′*.

A modification of my improvements is represented in Plate 2, Figs. 6 and 7, in which the back, instead of being hinged directly to the sliding arms *s s*, is attached to short arms *g′ g′*, rigidly secured to the back, and each turning upon a pivot, *h′*, in the sliding arms *s s*, the end of each arm being enlarged, as shown, and having a groove, *d*, formed therein in lieu of a mortise in the back for the play of the arm *g′* when the back is raised or lowered. By this means I am enabled to obtain a longer arm even than by the first-described arrangement, and it will be observed that no reclining-chair has previously been constructed in which a long arm could be used, and at the same time the back be placed in an entirely horizontal position and a vertical one also, and this without lowering the arms nearly in contact with the seat, which is the case in the operation of most reclining-chairs.

Having thus described my improvements, I shall state my claims as follows:

1. The general arrangement of devices herein described for actuating and sustaining both the back and foot-rest, the same consisting of the arms *f′ f′*, attached to the back in a projection thereof, and having a shaft which travels in grooves formed in the supporting frame-work of the chair and the arms, the whole being combined with the foot-rest frame, as set forth herein.

2. The combination of devices herein described, whereby the back can be placed and held in any desired position, and at the same time the proper length of arms retained, the same consisting of the hinged rails *p p*, sliding arms *s s*, locked upon said rails in any desirable manner, and mortises to receive the said rails, as set forth.

3. The foot-rest constructed and arranged sabstantially as described, when combined with a spring or weight, or its equivalent, to operate as set forth, so that the said foot-rest may be raised or lowered at will to adapt itself to the length of the limb of the occupant, substantially as described.

4. In combination with a reclining-chair constructed as described, the peculiar joint between the back and arms, the same consisting of the arm *g′*, attached to the back and turning upon a pivot in the groove or mortised sliding arm, whereby a very long arm may be obtained, as set forth.

AUGUSTUS ELIAERS.

Witnesses:

JOSEPH GAVETT,

ALBERT W. BROWN.